United States Patent [19]

Häuslein

[11] Patent Number: 4,779,520
[45] Date of Patent: Oct. 25, 1988

[54] COFFEE MAKER OR TEA MAKER
[75] Inventor: Reinhard Häuslein, Minden, Fed. Rep. of Germany
[73] Assignee: Melitta-Werke Bentz & Sohn, Minden, Fed. Rep. of Germany
[21] Appl. No.: 135,371
[22] Filed: Dec. 21, 1987
[30] Foreign Application Priority Data Dec. 22, 1986 [DE] Fed. Rep. of Germany ....... 3643879

[51] Int. Cl.$^4$ .............................................. A47J 31/00
[52] U.S. Cl. .......................................... 99/287; 99/295
[58] Field of Search ................. 99/279, 287, 295, 300, 99/304, 307, 280; 426/433

[56] References Cited

U.S. PATENT DOCUMENTS 2,858,762 11/1958 Wade ..................................... 99/287
3,092,011 6/1963 Gee ........................................ 99/287
3,666,558 5/1972 Pryor ..................................... 99/287
4,644,855 2/1987 Woolman .............................. 99/287

*Primary Examiner*—Robert W. Jenkins
*Attorney, Agent, or Firm*—Spencer & Frank

[57] ABSTRACT

A coffee maker or a tea maker includes a fresh-water container; a flow-through heater arranged for receiving water from the fresh-water container; an overflow arranged for receiving heated water from the flow-through heater; a filter holder accommodating the ground flavor carrier and arranged for receiving the heated water from the overflow; a receptacle arranged for receiving filtrate from the filter holder; and an agitating apparatus disposed in the vicinity of the overflow and the filter holder, for generating a movement of a flavor carrier located in the filter holder.

9 Claims, 6 Drawing Sheets

COFFEE MAKER OR TEA MAKER

FIELD OF THE INVENTION

The present invention relates to a coffee maker or tea maker having a fresh-water container, a flow-through heater having an overflow device, a filter holder for receiving a flavor carrier (such as ground roasted coffee or tea) and a container for receiving the filtrate.

BACKGROUND OF THE INVENTION

Coffee makers or tea makers for preparing a brew from a granulated flavor carrier of this generic type are known per se and are used primarily in households. Such household appliances have thus far been equipped with a stationary filter holder and an overflow device that although it is manually pivotal, is stationary during the brewing process. The outlet opening of the overflow device is disposed approximately above the center of the filter holder during the brewing process, so that the ground flavor carrier located in the filter holder is centrally moistened by the brewing water.

It has heretofore been unavoidable that at first only the middle region of the flavor carrier is moistened, while the peripheral zones are not wetted until later, regardless of the shape of the filter holder. In the conical filter holders that are most often used, the portion of the flavor carrier located in the peripheral zones of the cone are not reliably thoroughly moistened until the brewing water has backed up to above the upper edge of the flavor carrier inside the filter holder.

Since coffee makers or tea makers of this kind used mostly in the household have, because of small capacity requirements, a relatively small hot water flow rate, an optimal exploitation of the aromatic substances of the flavor carrier has thus far been impossible.

SUMMARY OF THE INVENTION

It is an object of the present invention to improve a coffee maker or tea maker of the above generic type by simple means so that better and more uniform utilization of a flavor carrier—that is, ground roasted coffee or tea—is attained.

This object and others to become apparent as the specification progresses, are accomplished by the invention, according to which, briefly stated, the hot beverage (coffee or tea) maker includes an apparatus, located in the vicinity of the overflow device and filter holder, for generating a relative motion of a ground flavor carrier located in the filter holder transversely and/or parallel to the vertical flow-through direction of the brewing water.

By means of the above-outlined, structurally comparatively simple arrangement, it is assured that even with a small flow rate of brewing water, uniform thorough moistening of a flavor carrier is attained, so that the utilization of the aromatic substances intrinsic in the flavor carrier is considerably improved and made more uniform. Transverse motions, oscillating motions and parallel motions of the flavor carrier relative to the brewing water are possible, in order to attain the advantageous effect of rapid and uniform thorough moistening of the flavor carrier.

According to a preferred embodiment, a relative motion of the flavor carrier transversely to the flow direction of the brewing water is generated by subjecting it to ultrasound, in which case the corresponding apparatus comprises an ultrasonic generator at the level of the filter holder.

In another preferred embodiment, a relative motion of the flavor carrier transversely and/or parallel to the vertical direction of the brewing water is effected by means of an apparatus in the form of a mechanical shaking device, preferably acting upon the filter holder itself.

According to still another preferred embodiment, the overflow device is equipped with an outlet head extending in the axial direction of the filter holder. The outlet head is provided with a plurality of outlet openings and is capable of being rotated. This arrangement assures that the brewing water no longer flows centrally into the filter holder, but instead is distributed over the entire surface of the flavor carrier located in the filter holder.

In yet another preferred embodiment, a stirring device is disposed in the vicinity of the filter holder. The stirring device is capable of being set into simultaneous rotational and axial motion, so that the flavor carrier, during the inflow of brewing water, is moved relative thereto.

DESCRIPTION OF THE PREFERRED EMBODIMENTS

Figure 1:
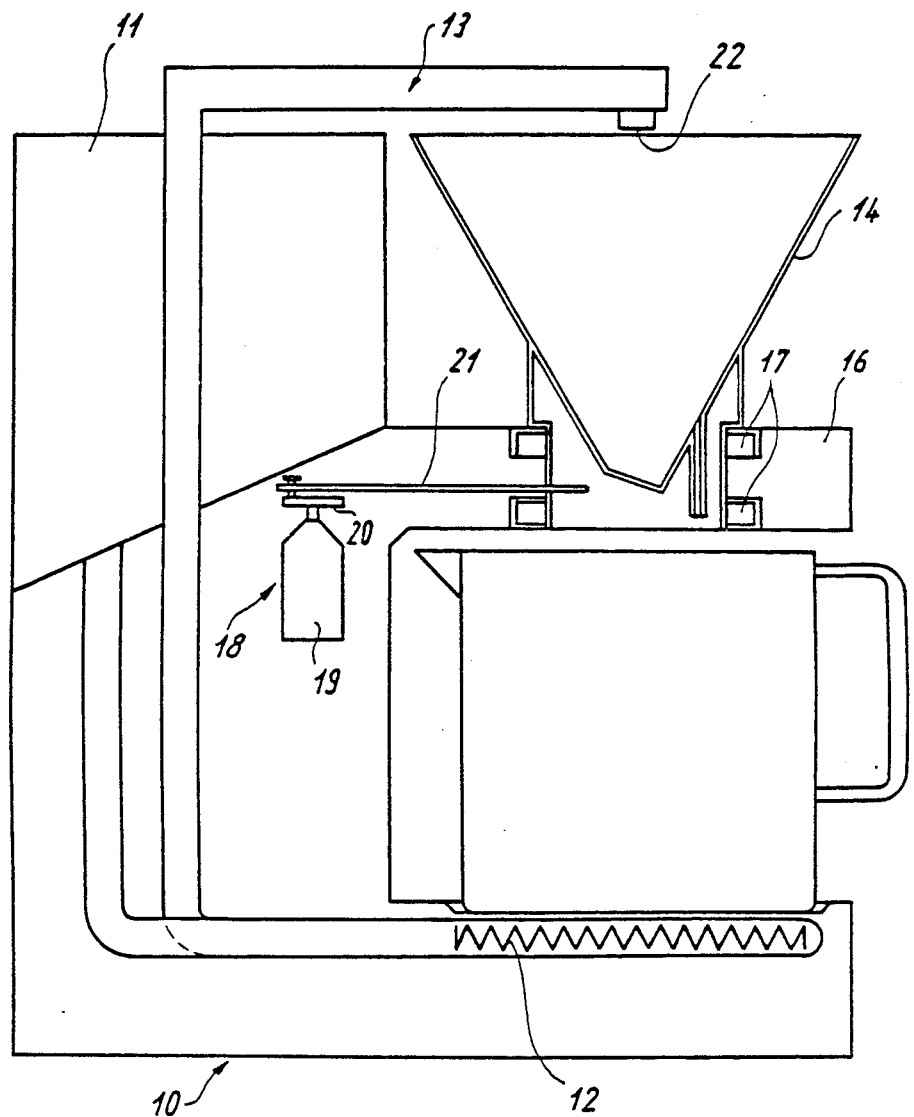
FIG. 1 is a schematic side elevational view of a first preferred embodiment of a coffee maker or tea maker embodying the invention.

A coffee maker or tea maker shown in all the figures is identified overall with the reference numeral 10. The coffee maker or tea maker 10 of FIGS. 1 and 2 comprises a fresh-water container 11, a flow-through heater 12, an overflow device 13, a filter holder 14 and a container 15 for receiving the filtrate.

The various elements 11–15 inclusive are characteristic components of a coffee maker or tea maker typically used in the household.

Before the coffee maker or tea maker 10 is put into operation, a filter paper insert is placed in the filter holder 14, the filter paper 14a, being indicated vestigially only in dotted lines at the top of the holder 14, not having been shown entirely for the sake of simplicity. A ground flavor carrier, for instance ground roasted coffee or tea, is then placed in the filter paper insert.

The fresh water located in the fresh-water container 11 is heated by the flow-through heater 12 and pumped by a pump (not shown) via the overflow device 13 in the form of brewing water into the filter holder 14.

The filtrate produced during the passage of the brewing water through the flavor carrier is collected in the container 15.

The central concept of the present invention is to bring about the most uniform possible moistening of the flavor carrier by the brewing water.

Figure 2:
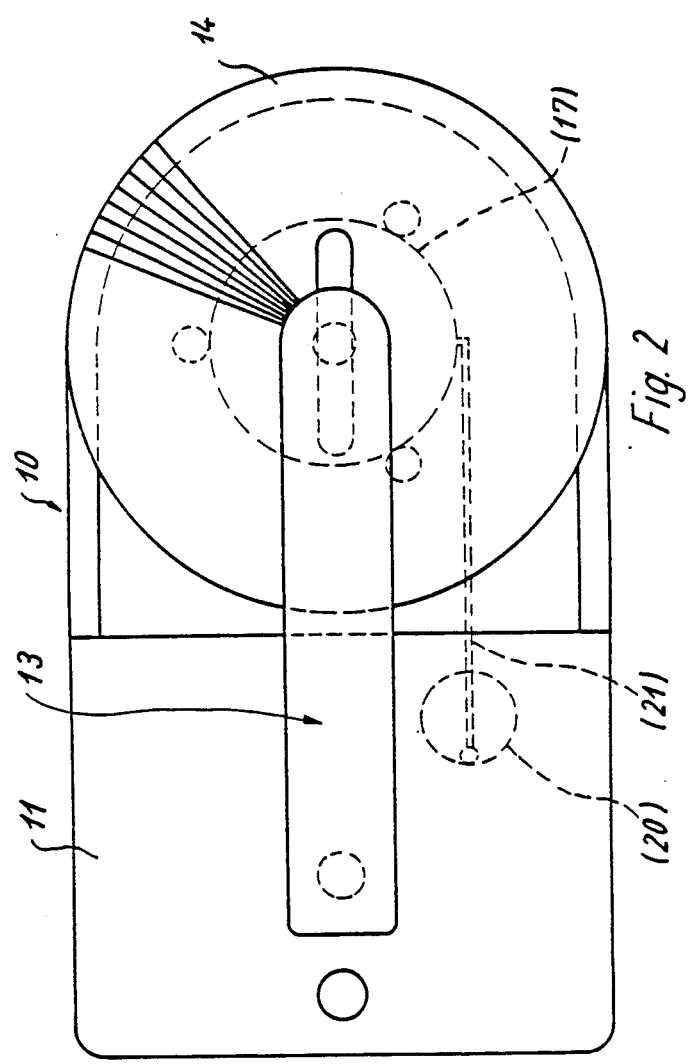
FIG. 2 is a schematic plan view of the coffee maker or tea maker of FIG. 1.

In the preferred embodiment of FIGS. 1 and 2, this concept is carried out by providing that the filter holder 14 is supported so that it is movable transversely to the vertical flow-through direction of the brewing water.

To this end, the filter holder 14 is supported in a support arm 16, inside a support ring 17, which is drivable relative to the stationary support arm 16 via a drive 18, comprising a drive motor 19, an eccentric disk 20 and a push rod 21. Via the eccentric drive 18, the support ring 17 and hence the filter holder 14 supported in it are movable back and forth transversely to the flow direction of the brewing water, by the attachment of the push rod 21 to the disk 20. This mobility of the filter holder 14 means that the brewing water fed via the overflow device 13 and its outlet opening 22 into the filter holder 14 can be fed more uniformly onto the flavor carrier located in the filter holder 14, and this in turn leads to the desired uniform thorough wetting of the flavor carrier.

Figure 3:
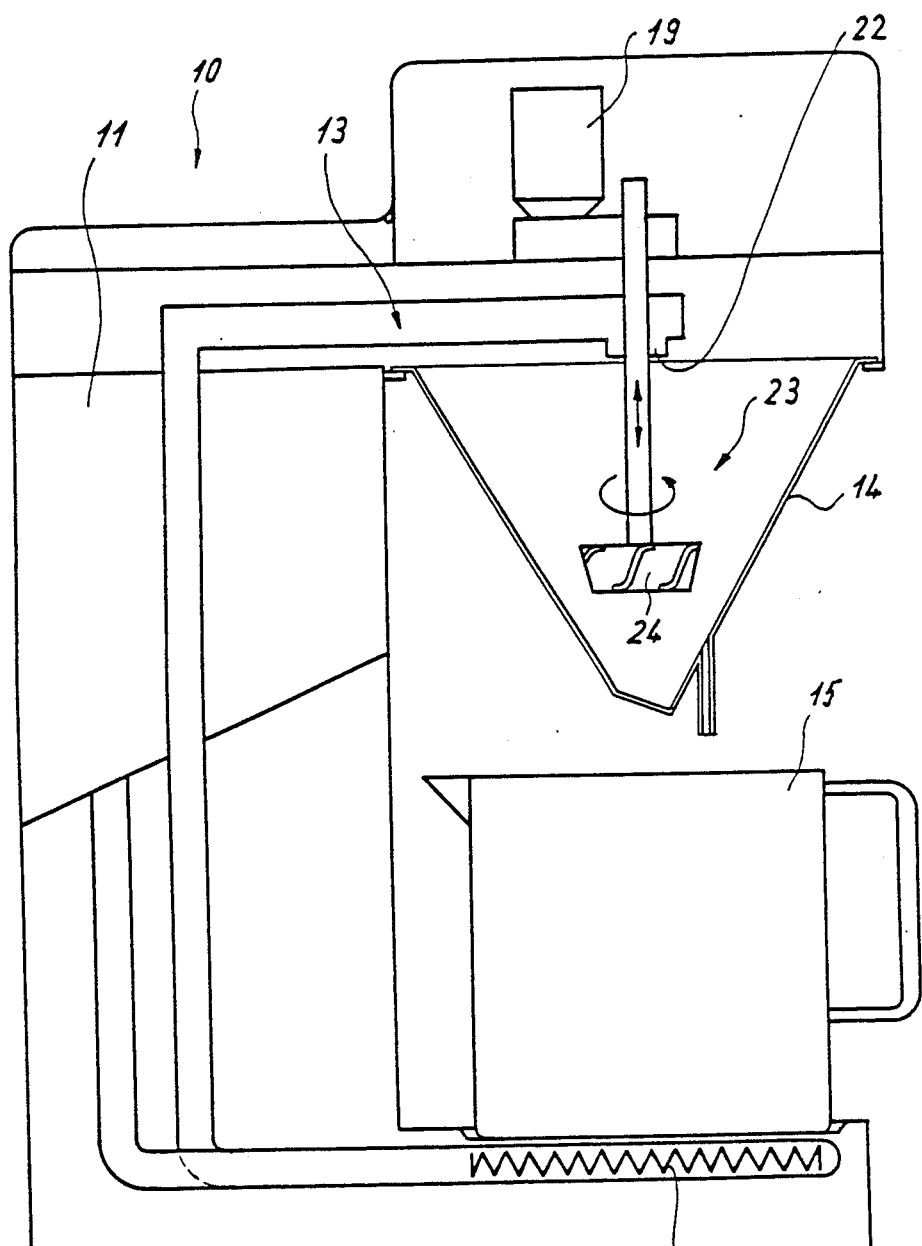
FIG. 3 is a schematic side elevational view of a second preferred embodiment of a coffee maker or tea maker embodying the invention.
Figure 4:
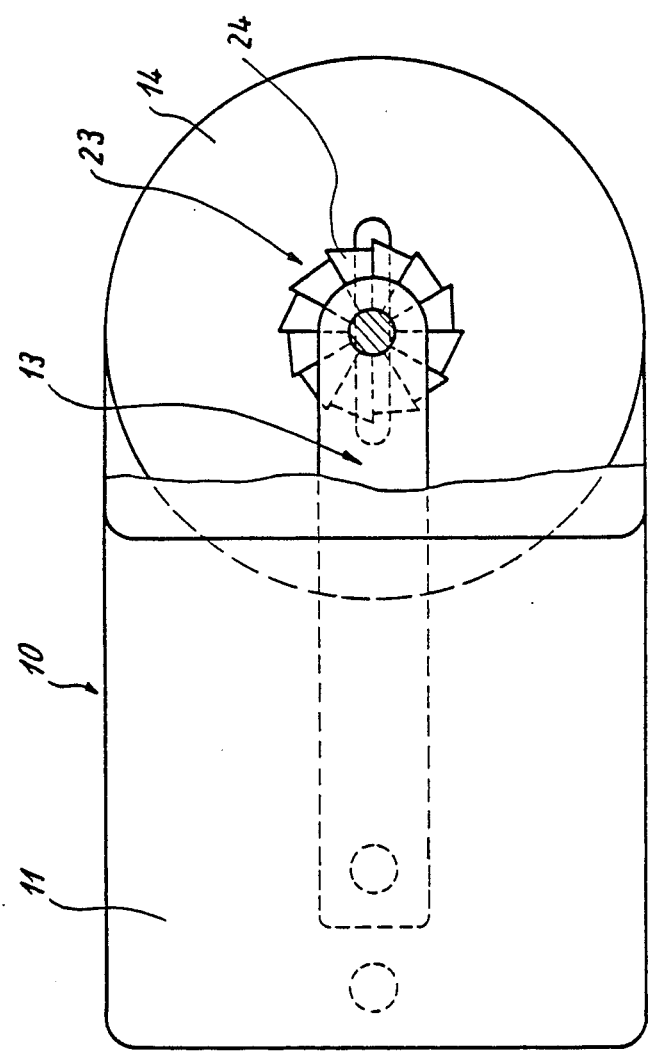
FIG. 4 is a schematic plan view of the coffee maker or tea maker of FIG. 3.

In FIGS. 3 and 4, another preferred embodiment of the invention is shown in which a stirring device 23 protrudes with a stirring head 24 into the filter holder 14. This stirring device 23 can be set into rotational motion by means of a drive motor 19, similar to that of FIGS. 1 and 2, although differently positioned in the embodiment of FIGS. 3 and 4. The stirring device 23 can furthermore be raised and lowered in the axial direction, as indicated by the double-headed arrow in FIG. 3, by any suitable drive means.

By means of the stirring head 24 of the stirring device 23, a flavor carrier located in the filter holder 14 can be moved during the inflow of brewing water and can interact in counterflow with the inflowing water.

Figure 5:
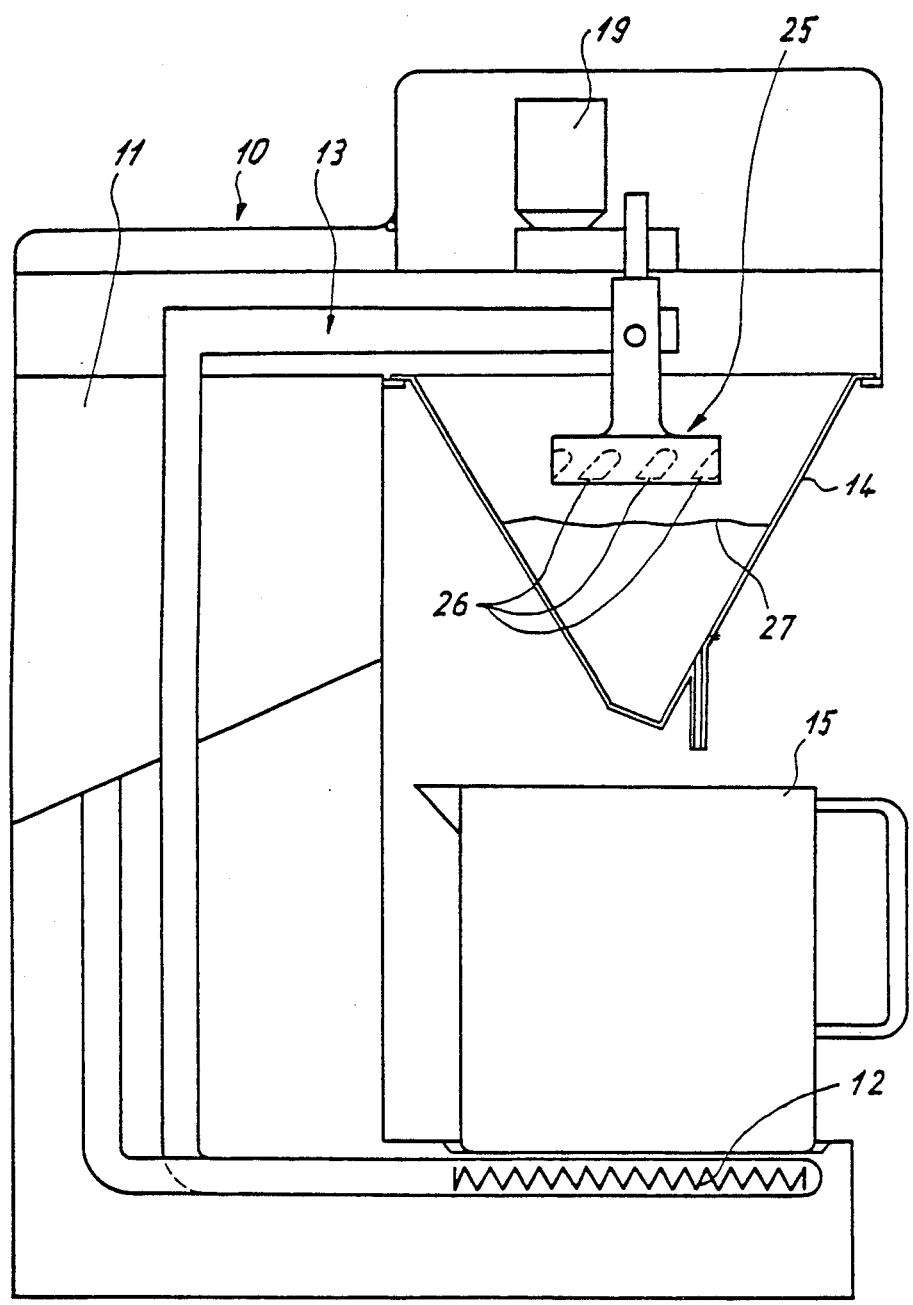
FIG. 5 is a schematic side elevational view of a third preferred embodiment of a coffee maker or tea maker embodying the invention.

In FIG. 5, a further preferred embodiment of the invention is shown in which the overflow device 13 is provided with an outflow head 25, which in turn can be driven rotatably by a drive motor 19, similar to the motor 19 of FIGS. 3 and 4. This outlet head is provided on its underside with a multiplicity of tangentially extending outlet openings 26, by means of which the brewing water fed via the overflow device 13 to the head 25 and thence to the outlet openings 26, is fed onto the flavor carrier 27 located in the filter holder 14, with simultaneous rotation of the outlet head 25. In this embodiment too, because of the rotation of the outlet head 25 with its outlet opening 26, a relative motion between the flavor carrier 27 and the vertical flow-through direction of the brewing water takes place.

Figure 6:
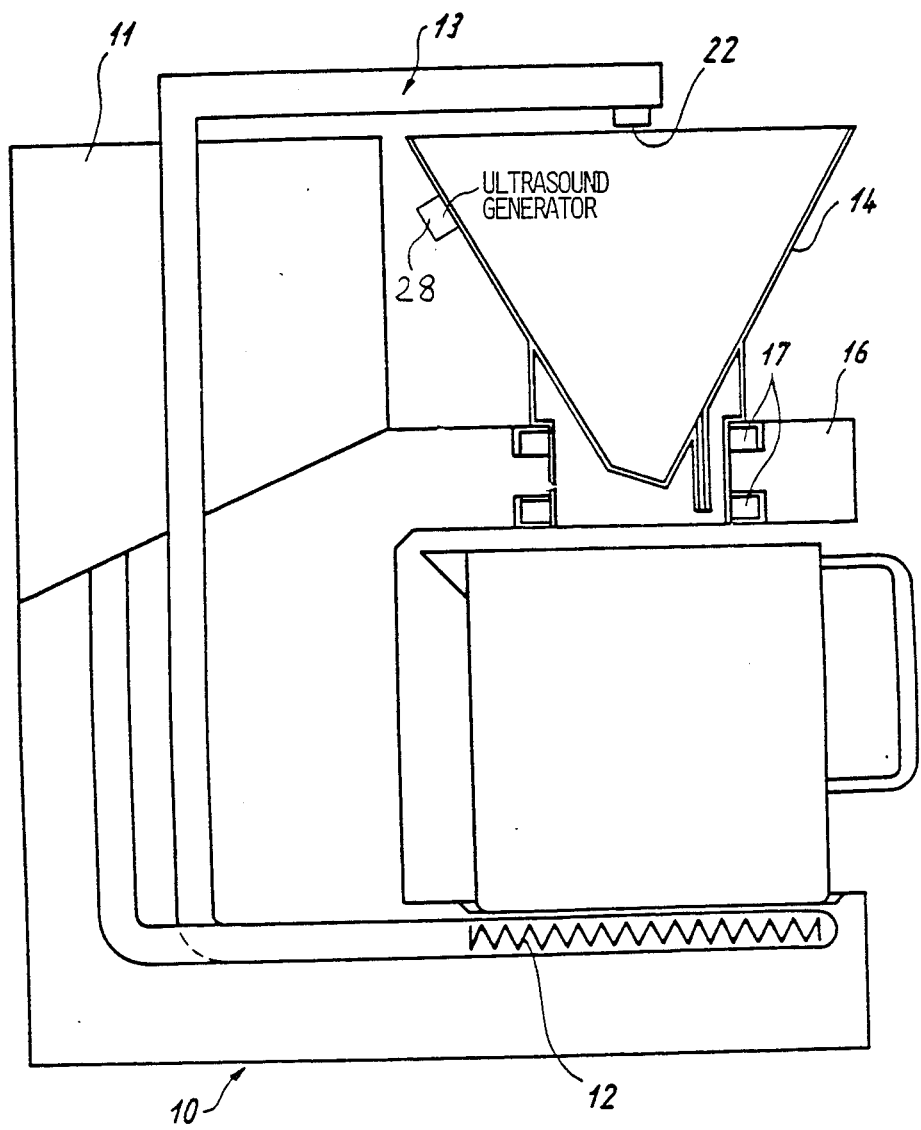
FIG. 6 is a schematic side elevational view of a fourth preferred embodiment of a coffee maker or tea maker embodying the invention.

According to another preferred embodiment illustrated in FIG. 6, the device causing the motion of the flavor carrier particles is an ultrasound generator 28 generating ultrahigh frequency sound waves positioned in stationary fashion, for example, outside the filter holder 14. This generator 28 can be used in order to set the flavor carrier located in the filter holder 14 into motion during the flow through it of the brewing water.

In terms of mechanical aspects as well, other structural versions are possible; for instance, the portion of the overflow device having the outflow opening 22 can also be moved transverse to the filter holder 14 during the feeding of brewing water, or such movement can be combined with a movement of the filter holder.

The present disclosure relates to subject matter contained in Federal Republic of Germany Patent Application No. 36 43 879.0 (filed Dec. 22, 1986) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a device for preparing a brew from a ground flavor carrier, including
    a fresh-water container;
    a flow-through heater arranged for receiving water from said fresh-water container;
    an overflow arranged for receiving heated water from said flow-through heater;
    a filter holder accommodating the ground flavor carrier and arranged for receiving the heated water from said overflow; and
    a receptacle arranged for receiving filtrate from said filter holder;
    the improvement comprising
    agitating means disposed in the vicinity of the overflow and the filter holder, for generating a movement of a flavor carrier located in the filter holder.

2. A device as defined in claim 1, wherein said agitating means includes means for generating a movement being transverse to a vertical flow-through direction of the brewing water.

3. A device as defined in claim 1, wherein said agitating means includes means for generating a movement being parallel to a vertical flow-through direction of the brewing water.

4. A device as defined in claim 1, said agitating means comprising an ultrasound generator situated externally of the filter holder.

5. A device as defined in claim 1, said agitating means comprising a rotatably drivable outlet head connected to said overflow and having an underside, the head having a plurality of outlet openings located on its underside for discharging the heated water.

6. A device as defined in claim 1, said agitating means comprising a drivable stirring means in the vicinity of and protruding into the filter holder.

7. A device as defined in claim 6, said stirring means comprising a drive motor and a head both axially movable and rotationally driven by the drive motor.

8. A device as defined in claim 1, said agitating means comprising a mechanical shaking device.

9. A device as defined in claim 8, said shaking device comprising a drive motor, an eccentric disk driven by the drive motor, a push rod driven by the disk, a stationary support arm, and a support ring movably supported in the arm, the support ring receiving the filter holder and being driven by the push rod.

* * * * *